Sept. 13, 1938.  H. A. IAMS  2,130,134
OSCILLOGRAPH APPARATUS
Filed Jan. 30, 1937
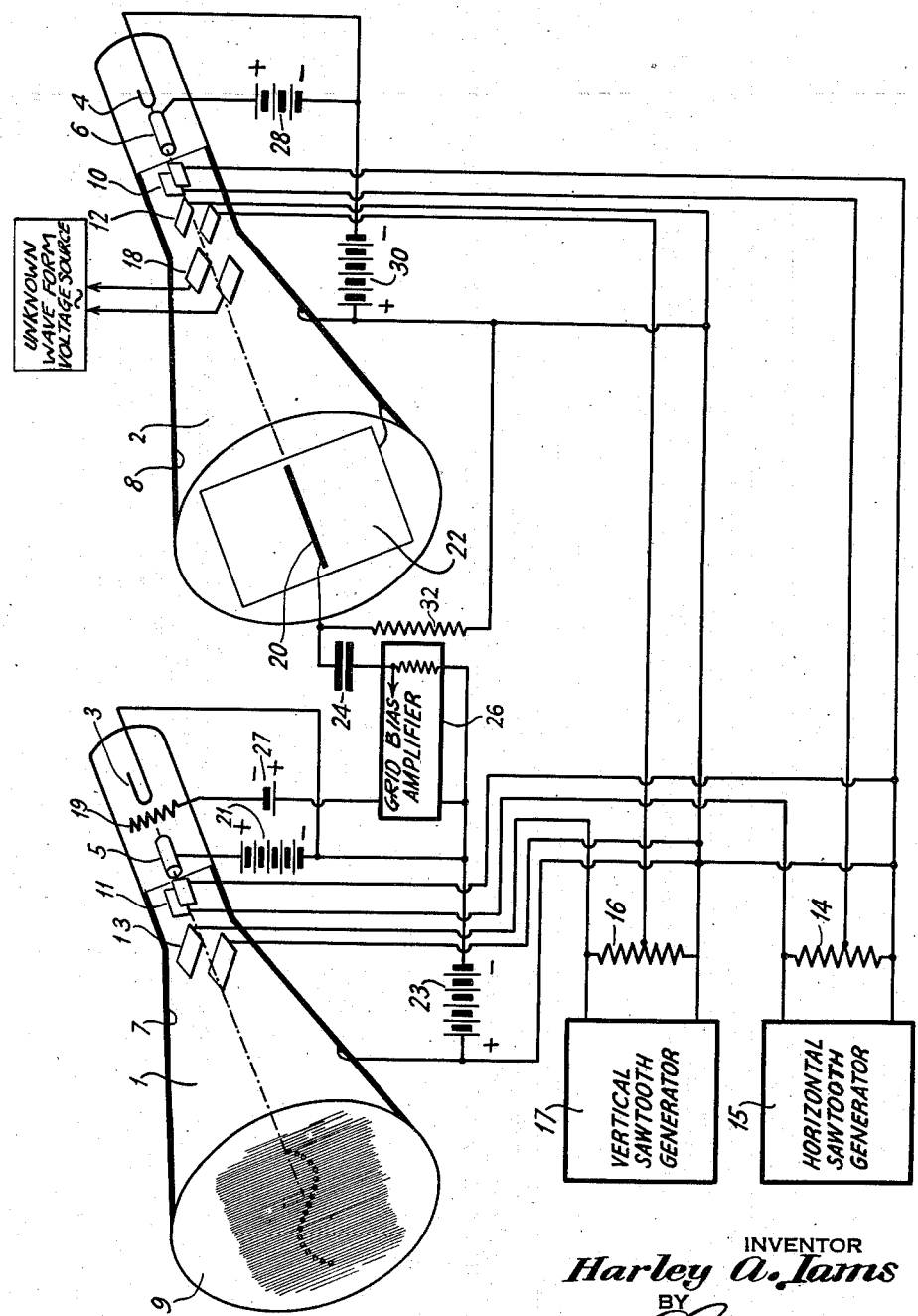
INVENTOR
Harley A. Iams
BY
Charles McClair
ATTORNEY Patented Sept. 13, 1938

2,130,134

UNITED STATES PATENT OFFICE 2,130,134

OSCILLOGRAPH APPARATUS

Harley A. Iams, Berkley Heights, N. J., assignor, by mesne assignments, to Radio Corporation of America, a corporation of Delaware Application January 30, 1937, Serial No. 123,122

6 Claims. (Cl. 171—95)

My invention relates to cathode ray oscillographs, and more particularly to apparatus utilizing cathode ray tubes and circuits for obtaining accurate current and voltage curves in which the vertical scale is much larger than in similar curves obtainable with the conventional oscillograph.

Cathode ray oscillographs with electrostatic or electromagnetic beam deflecting means require a relatively high beam voltage and consequent high beam velocity to produce a visible trace or curve on a fluorescent viewing screen. With beams of high velocity, the deflection sensitivity or ratio of beam deviation to the change in deflecting potential is rather low, and a deflecting voltage which varies only a few volts produces on the screen a curve which is on too small a scale to show such variations clearly, hence the oscillograph is in practice used only with rather high deflecting voltages subject to rather wide variations. The scale of the voltage curve on the screen has been enlarged by amplifying the voltage to be examined and applying the amplified voltage to the deflecting means of the oscillograph, but the results are not as good as desired, as the conventional amplifiers are apt to introduce some distortion, due either to a non-linear characteristic or to inherent "noise" effects. Furthermore, it is often desirable to study low voltage or current phenomena which cannot be readily amplified for application to the deflection system of a conventional cathode ray oscillograph. For such study it is customary to employ methods which utilize a static galvanometer, but such methods have serious disadvantages where it is desired to observe various portions of the voltage or current characteristic.

The principal object of my invention is to provide an oscillograph of very high deflection sensitivity by which very small variations in deflection voltage and frequency can be shown accurately and on a large scale on a fluorescent screen by a luminous trace or curve which is as visible as that of the conventional high voltage oscillograph.

To this end a conventional oscillograph is used as a viewing tube in which the high-voltage high-velocity electron beam scans the fluorescent screen in a rectangular pattern by sweeping over the screen in succession along parallel paths of constant length, like the beam in a cathode ray television receiver. The beam is normally of low intensity, but at some point in its travel along each of its parallel paths the intensity is momentarily increased to produce a bright spot of light on the screen. As a result a row of bright spots corresponding in number and spacing to the parallel paths of the scanning beam appear on the screen and form an easily visible curve or trace. The displacement of each bright spot with reference to the preceding spot is a function of the change in the unknown voltage which occurs during the period between the appearance of the two spots, hence the row of bright spots forms a curve which corresponds to the wave form of the unknown voltage.

By my apparatus the momentary increases in scanning beam intensity are produced by intermittent voltage impulses of the same frequency as the sweeps of the scanning beam, each voltage impulse appearing during a portion of each sweep of the scanning beam. The extent of displacement of each bright spot with reference to the preceding bright spot depends upon the extent to which the phase relation between the sweep voltage and the voltage impulses changes during the intervals between the voltage impulses. As this phase relation is dependent on the magnitude of the unknown voltage during each voltage impulse, the position of each bright spot with relation to the others depends on the magnitude of the unknown voltage at the instant the spot appears, and therefore the row of bright spots will correspond to the wave form of the unknown voltage.

Other objects, features, and advantages of my invention will appear from the following description taken in connection with the drawing in which the figure illustrates one form of my invention.

Referring to the drawing the viewing tube 1 is a conventional high voltage cathode ray oscillograph, with the usual electron gun comprising a cathode 3 either of the directly heated or unipotential type, a first anode 5, and a second anode 7, preferably in the form of a conductive coating deposited on the inner wall of the tube, the usual fluorescent viewing screen 9, and two sets of electrostatic electron beam deflection plates 11 and 13. Each set of deflection plates is connected to a source of beam sweeping potential, such as the horizontal and vertical saw-tooth generators, 15 and 17, shown schematically, for the purpose of moving the electron beam over the surface of the fluorescent screen as in cathode ray television reception, to scan the screen in a series of substantially parallel lines forming a rectangular pattern. The potentials between the cathode 3 and the anodes 5 and 7 are relatively high, preferably of the order of 1500 and 4600 volts supplied by the batteries 21 and 23, respectively, so that the electron beam when of normal intensity will produce on the fluorescent screen curves of good visibility.

The intensity of the electron beam is controlled by an intensity control electrode or grid 19 normally biased negatively by the battery 27, and preferably to cut-off, so that the beam is insufficient to illuminate the fluorescent screen 9, which remains dark as long as the grid bias is normal. When the bias is removed from the electrode 19 the beam becomes sufficiently intense to produce luminescence on the fluorescent screen. Momentary removal of the bias during the sweep of the beam will produce a bright spot, and sequential repetition of the bias removal will result in a number of bright spots, one for each scanning line, each spot being displaced from the others and lying on the scanned line, thus simulating a continuous curve on the fluorescent screen.

The bias is removed from the beam intensity control grid 19 of the viewing tube at intervals necessary to make the row of spots on the screen of the viewing tube appear as a continuous curve corresponding to an unknown wave form by a contact making device, preferably a low voltage high deflection sensitivity cathode ray tube with a special electrode and connections which enable it to act as a control tube for removing the bias at the proper intervals from the beam intensity control grid of the viewing tube.

The specific control tube shown is a low voltage low beam velocity cathode ray tube 2 comprising an evacuated envelope enclosing a cathode 4, either directly heated or unipotential, first and second anodes 6 and 8 which may be connected to sources of low positive potential, such as batteries 28 and 30, which impress a potential of the order of 10 and 25 volts on the respective anodes, and two sets of deflection electrodes 10 and 12 connected to the same sources of beam sweeping potential as the deflection electrodes of the viewing tube 1 through voltage dividers 14 and 16. The amplitude of beam deflection is inversely proportional to the second anode voltage in each of the two tubes so that with desired deflection amplitude in tube 1 it is necessary to reduce the horizontal and vertical deflection voltages applied to the electrodes 10 and 12 of the tube 2 by adjusting the voltage dividers 14 and 16 to obtain an equivalent deflection amplitude in the tube. Since the cathode ray beam is deflected horizontally and vertically over a rectangular pattern in each of the two tubes by similar horizontal and vertical deflection electrodes which are energized from the same sources of deflection potential, the beams of the two tubes swing in synchronism, follow equivalent paths both with respect to time and to displacement, and trace similar rectangular patterns.

In order that the control tube may, during each line sweep of the beam, remove the bias from the beam intensity control grid of the viewing tube, I provide at the end of the tube 2 an electrode 20 which is crossed by the beam during each line sweep, and which is so connected that the bias on the intensity control grid 19 of the viewing tube is removed or reduced while the beam is on the electrode. The electrode 20 may be a narrow straight conductor, preferably a wire about 1 mm. in diameter, which extends across the end of the tube, preferably across a point in line with the cathode-anode axis of the tube, and which is connected to the positive side of the battery 30 through a resistor 32 of approximately 100,000 ohms to float the electrode 20 at the second anode potential. The electrode may to advantage be carried by, but insulated from, a metal plate 22 preferably connected to the second anode 8. The electrode 20 is so connected to the beam intensity control grid 19 of the viewing tube through a condenser 24, an amplifier 26 and a biasing battery 27 that the drop in voltage on the electrode 20 which occurs when the scanning beam is on the electrode will reduce or remove the normal bias voltage on the grid 19.

The row of bright dots produced on the screen of the viewing tube as the scanning beam of the control tube crosses the electrode 20 during the "tracing" of the rectangular pattern is warped into a curve representing the wave form of an unknown voltage by shifting the rectangular scanned pattern in the control tube with reference to the electrode 20 in synchronism with and to an extent dependent on the variations in the unknown voltage. To this end I provide auxiliary deflection electrodes 18 which are preferably parallel to the electrode 20 and on opposite sides of the beam path. When the unknown voltage is applied to the auxiliary electrodes the rectangular pattern traced by the beam is displaced vertically with reference to the electrode 20, in a direction substantially transverse to the horizontal electrode, and to an extent dependent on the magnitude of the unknown voltage, causing a corresponding vertical displacement of the bright spots on the screen of the viewing tube.

In operation the anodes 5 and 7 of the viewing tube 1 are energized with anode potentials of the order of 1500 and 4600 volts respectively, to obtain good visiblity of the luminescent trace, while anodes 6 and 8 of the control tube 2 are energized at a much lower potential, depending on the deflection sensitivity required to give the desired vertical scale to the wave form to be studied on tube 1. Since the beams in the two tubes trace corresponding rectangular patterns, a given point in the rectangular pattern on the fluorescent screen of the viewing tube 1 will be scanned by the beam at the same time and from the same direction as a corresponding point in the corresponding rectangular pattern of the control tube 2. The vertical scanning or line frequency is made a high multiple of the horizontal scanning or frame frequency. The beam of the control tube 2 crosses the electrode 20 during each line sweep of the beam, producing a voltage impulse to the control grid 19 of the viewing tube 1 while the beam in the viewing tube is making a line sweep, so that these impulses occur at the same frequency as the line sweeps of the beam in the viewing tube. Each time the electron beam crosses the electrode 20 a voltage impulse through the amplifier 26 removes the bias from the beam intensity control electrode 19 of the viewing tube 1 and causes a period of fluorescence on the viewing screen 9. With horizontal progression of the line scanning along the electrode 20 the successive crossings of the electrode 20 by the electron beam will produce corresponding and successive periods of fluorescence on the fluorescent screen. If the pattern covered by the beam of tube 2 remains stationary, the voltage impulses from the control tube will be in phase with the line sweep voltage of tube 1, and a straight row or line of bright spots simulating the electrode 20 of the control tube 2 appears on the screen 9.

The voltage phenomena of unknown wave form of which a visible trace is desired on tube 1 is applied directly to the auxiliary deflection electrodes 18 of tube 2 to further deflect the electron beam after its initial deflection by the line scanning electrodes 12. This further or additional deflection by the auxiliary electrodes 18 causes a vertical shift of the entire scanning pattern in tube 2 in response to the unknown voltage so that the pattern is no longer bisected by the electrode 20, but lies with a greater area either above or below the electrode 20. The vertical displacement from the position of rest where the pattern is bisected by the elctrode 20 causes a phase displacement between the line sweep voltage of tube 1 and the voltage impulses from tube 2, the extent of the displacement depending on the instantaneous value of the voltage on the auxiliary deflection electrodes 18 during each voltage impulse. As the pattern in tube 1 is not subjected to such displacement the bias of the beam intensity control electrode 19 of tube 1 will, during each line sweep, be removed at an earlier or later time with respect to the vertical travel of the scanning beam in tube 1. The luminous spots on the screen of tube 1 will therefore be displaced vertically, above or below their normal position of rest in direct proportion to the displacement of the pattern in tube 2 and thereby produce a curve which is the true representation of the unknown wave form.

The horizontal and vertical saw-tooth wave generators 15 and 17 may be operated at frequencies of the order of 30 and 6000 cycles per second for 200 line scanning detail, this frequency being adequate for viewing phenomena having a low period of reoccurrence such as 0 to 100 cycles per second. The horizontal and vertical scanning frequencies may be increased proportionally for studying phenomena of higher frequencies. Thus to examine in 200 line detail one cycle or period of a radio frequency of 75 kilocycles it would be desirable to provide horizontal and vertical scanning frequencies of 75 kilocycles and 15 megacycles respectively, whereas to study a 5000 cycles per second modulation characteristic of such a signal in similar line detail it would be desirable to reduce these frequencies to the order of 500 cycles and 100 kilocycles respectively, to portray an envelope including 10 cycles of the modulation characteristic.

While I have shown but one modification and several applications of my invention, it is to be understood that I do not desire to be limited thereby except as is necessitated by the prior art and the spirit of the appended claims.

I claim:

1. An oscillograph apparatus including a cathode ray viewing tube having a fluorescent screen, an electron gun including a cathode and an anode for projecting a cathode ray beam on said screen, a control grid normally biased to cut off said beam, beam deflection plates for moving the cathode ray beam over said screen, means for impressing on said anode a uniform positive potential with respect to said cathode, means for impressing on said plates an intermittent deflection voltage of predetermined frequency to sweep said beam over said screen at the predetermined frequency, means for producing intermittent grid control voltage impulses at the same frequency as said deflection voltage for removing the control grid bias during each voltage impulse, and voltage measuring means for varying the phase relation of said voltage impulses and said deflection voltage to an extent dependent on the magnitude of the observed voltage on said voltage measuring means during each of said voltage impulses.

2. An oscillograph apparatus including a cathode ray viewing tube having a fluorescent screen, an electron gun for projecting a cathode ray beam on said screen, a control grid normally biased to cut off said beam, beam deflection plates for moving the cathode ray beam over said screen, a cathode ray control tube comprising an electron gun for projecting a cathode ray beam, a conductor perpendicular to the path of said beam, beam deflection plates for sweeping said beam transversely across said conductor in parallel paths longer than the width of said conductor, an electrical connection from said conductor to said control grid to decrease the bias on said control grid while said beam is on said conductor, a sweep circuit connected to the beam deflection plates of both of said tubes, and a pair of auxiliary beam deflection plates in said control tube for deflecting said beam transversely of said conductor.

3. An oscillograph apparatus comprising in combination a pair of cathode ray tubes, each having means for producing a beam of electrons and two sets of deflection plates to deflect said beam in a substantially rectangular pattern, two sweep circuits each connected to the corresponding sets of beam deflection plates of both of said tubes, a control grid in one of said tubes normally biased to cut off the beam, a fluorescent screen in said tube in the path of the normally cut-off beam, a conductor in the other tube perpendicular to the path of the beam and positioned to bisect the pattern traced by said beam, when said pattern is in normal position, auxiliary beam deflection plates in said other tube for deflecting said beam to move said pattern transversely across said conductor, and an amplifier connected between said conductor and said control grid to decrease the bias on said control grid while the beam is on said conductor.

4. An oscillograph apparatus including a cathode ray viewing tube having a fluorescent screen, an electron gun for projecting a cathode ray beam on said screen, a control grid normally biased to cut off said beam, two sets of beam deflection plates to sweep said beam over said screen vertically and horizontally, a cathode ray control tube comprising an electron gun for projecting a cathode ray beam, a conductor perpendicular to the path of said beam, two sets of beam deflection plates for sweeping said beam transversely across said conductor in parallel paths longer than the width of said conductor and along said conductor, an amplifier connected to said conductor and said control grid to decrease the bias on said control grid while said beam is on said conductor, two sweep circuits, each connected to corresponding sets of beam deflection plates of both of said tubes, and a pair of auxiliary beam deflection plates in said control tube for deflecting said beam transversely of said conductor.

5. An oscillograph apparatus including a cathode ray viewing tube having a fluorescent screen, an electron gun for projecting a cathode ray beam on said screen, a control grid normally biased to cut off said beam, beam deflection means for moving the cathode ray beam over said screen in two directions, a cathode ray control tube comprising an electron gun for projecting a cathode ray beam, a conductor perpendicular to the path of said beam, beam deflection means for sweeping said beam transversely across said conductor in parallel paths longer than the width of said electrode, an electrical connection from said conductor to said control grid to modify the bias on said control grid while said beam is on said conductor, a sweep circuit connected to the corresponding beam deflection means of both of said tubes, and a pair of beam deflection plates in said control tube for deflecting said beam transversely of said conductor.

6. An oscillograph apparatus comprising in combination a pair of cathode ray tubes, each having means for producing a beam of electrons and two sets of beam deflection means to deflect the beam of each tube in a substantially rectangular pattern, two sweep circuits each connected to the corresponding sets of said beam deflection means of both of said tubes, a control grid in one of said tubes normally biased to cut off the beam, a fluorescent screen in said tube in the path of the normally cut off beam, an electrode in the other tube perpendicular to the path of the beam and positioned to bisect the substantially rectangular pattern traced by said beam when said pattern is in normal position, auxiliary beam deflection plates in said other tube for deflecting said beam to move said pattern transversely across said conductor and an amplifier connected between said conductor and said control grid to decrease the bias on said control grid while the beam is on said conductor.

HARLEY A. IAMS.